(12) United States Patent
Tatsu

(10) Patent No.: US 11,338,763 B2
(45) Date of Patent: May 24, 2022

(54) PEDESTRIAN PROTECTION DEVICE FOR VEHICLE

(71) Applicant: ISUZU MOTORS LIMITED, Tokyo (JP)

(72) Inventor: Kouichi Tatsu, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 282 days.

(21) Appl. No.: 16/648,566

(22) PCT Filed: Sep. 18, 2018

(86) PCT No.: PCT/JP2018/034348
§ 371 (c)(1),
(2) Date: Mar. 18, 2020

(87) PCT Pub. No.: WO2019/059146
PCT Pub. Date: Mar. 28, 2019

(65) Prior Publication Data
US 2020/0216012 A1 Jul. 9, 2020

(30) Foreign Application Priority Data
Sep. 19, 2017 (JP) .............................. JP2017-179385

(51) Int. Cl.
*B60R 21/36* (2011.01)
*B60R 21/013* (2006.01)
*B60R 21/01* (2006.01)

(52) U.S. Cl.
CPC ............ *B60R 21/36* (2013.01); *B60R 21/013* (2013.01); *B60R 2021/01013* (2013.01)

(58) Field of Classification Search
CPC .................................................. B60R 21/36
See application file for complete search history.

(56) References Cited

U.S. PATENT DOCUMENTS 5,810,427 A * 9/1998 Hartmann ......... B60R 21/26005
296/68.1
7,543,677 B2 * 6/2009 Igawa ................. B60R 21/0134
280/735
(Continued)

FOREIGN PATENT DOCUMENTS

CN 202271957 U 6/2012
CN 106004775 A 10/2016
(Continued)

OTHER PUBLICATIONS

International Search Report and Written Opinion for related PCT App No. PCT/JP2018/034348 dated Nov. 27, 2018, 9 pgs. (partial translation).
(Continued)

*Primary Examiner* — Nicole T Verley
(74) *Attorney, Agent, or Firm* — Procopio, Cory, Hargreaves & Savitch LLP

(57) ABSTRACT

A plurality of airbags 14 are arranged, in a deflated state, at mutually different heights behind respective panels of a front face part of a vehicle, and are capable of being deployed frontward from the front face part of the vehicle. A head position deduction unit 19 of an ECU 15 deduces the height position of the head of a pedestrian from information provided by a vehicle forward camera 12 and a millimeter-wave radar 13. A collision detection unit 18 of the ECU 15 computes, from information provided by the millimeter-wave radar 13 and a vehicle speed sensor 11, a time-to-collision TTC with respect to the pedestrian, and, after elapse of the time-to-collision TTC, detects a collision between the vehicle and the pedestrian. When a collision between the vehicle and the pedestrian is detected by the collision detection unit 18, an airbag control unit 20 of the ECU 15 deploys, from among the plurality of airbags 14, an (Continued)

airbag 14 that can be deployed at the pedestrian's head height position deduced by the head position deduction unit 19.

7 Claims, 8 Drawing Sheets

(56) References Cited

U.S. PATENT DOCUMENTS

| | | | |
|---|---|---|---|
| 7,845,455 B2 * | 12/2010 | Kim | B60R 21/36 |
| | | | 180/274 |
| 7,905,314 B2 * | 3/2011 | Mathevon | B60R 21/34 |
| | | | 180/274 |
| 10,336,290 B1 * | 7/2019 | Lazaro | B60R 21/36 |
| 11,242,022 B2 * | 2/2022 | Umezawa | B60R 21/0132 |
| 2015/0151700 A1 | 6/2015 | Revankar et al. | |
| 2015/0183395 A1 | 7/2015 | Revankar et al. | |
| 2015/0203067 A1 | 7/2015 | Revankar et al. | |
| 2017/0182971 A1 | 6/2017 | Revankar et al. | |
| 2020/0047709 A1 * | 2/2020 | Gunji | B60R 21/38 |

FOREIGN PATENT DOCUMENTS

| | | | | |
|---|---|---|---|---|
| CN | 107690399 A | | 2/2018 | |
| DE | 10345387 B4 | * | 7/2014 | ........... B60R 19/483 |
| DE | 19935342 B4 | * | 9/2014 | ............. B60R 21/36 |
| DE | 102018002020 A1 | * | 9/2018 | |
| DE | 102017112276 A1 | * | 12/2018 | ............. B60R 21/36 |
| DE | 102018115493 A1 | * | 1/2019 | ........... B60R 19/205 |
| EP | 2995508 B1 | * | 10/2017 | ............. B60R 19/40 |
| EP | 3321139 A1 | * | 5/2018 | ............. B60R 21/36 |
| EP | 3376249 A1 | * | 9/2018 | ............. B60R 21/01 |
| JP | 2006273139 A | | 10/2006 | |
| JP | 2009190606 A | | 8/2009 | |
| JP | 2009220645 A | * | 10/2009 | |
| JP | 2009234462 A | * | 10/2009 | ............. B60R 21/36 |
| JP | 2010012966 A | | 1/2010 | |
| JP | 2012131463 A | | 7/2012 | |
| JP | 2016107647 A | | 6/2016 | |
| JP | 2016168995 A | | 9/2016 | |
| JP | 2017502874 A | | 1/2017 | |
| JP | 2019084986 A | * | 6/2019 | |
| WO | WO-2006070865 A1 | * | 7/2006 | ......... B60R 21/0134 |
| WO | WO-2018173514 A1 | * | 9/2018 | |

OTHER PUBLICATIONS

The State Intellectual Property Office of People's Republic of China, The First Office Action, Application No. 201880060211.0, dated Sep. 18, 2021, in 12 pages.

* cited by examiner

[FIG. 1]
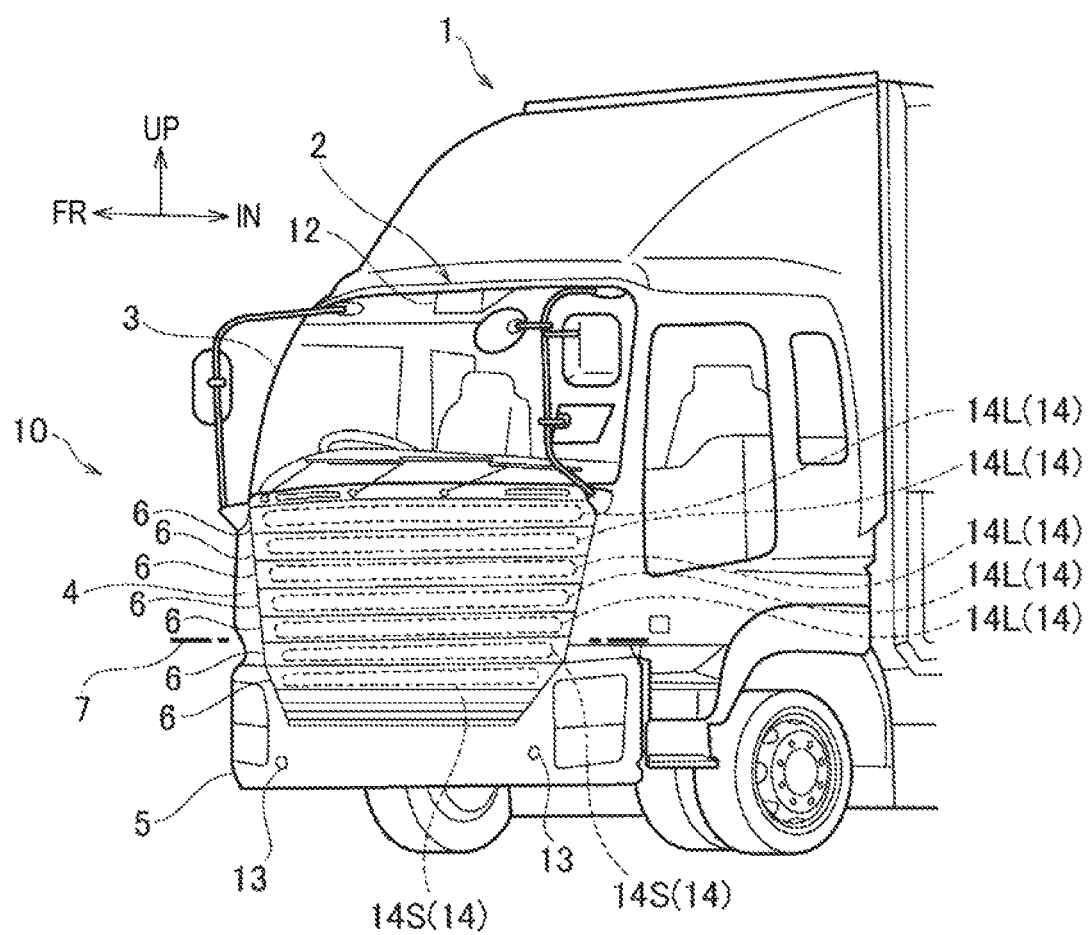

[FIG. 2]
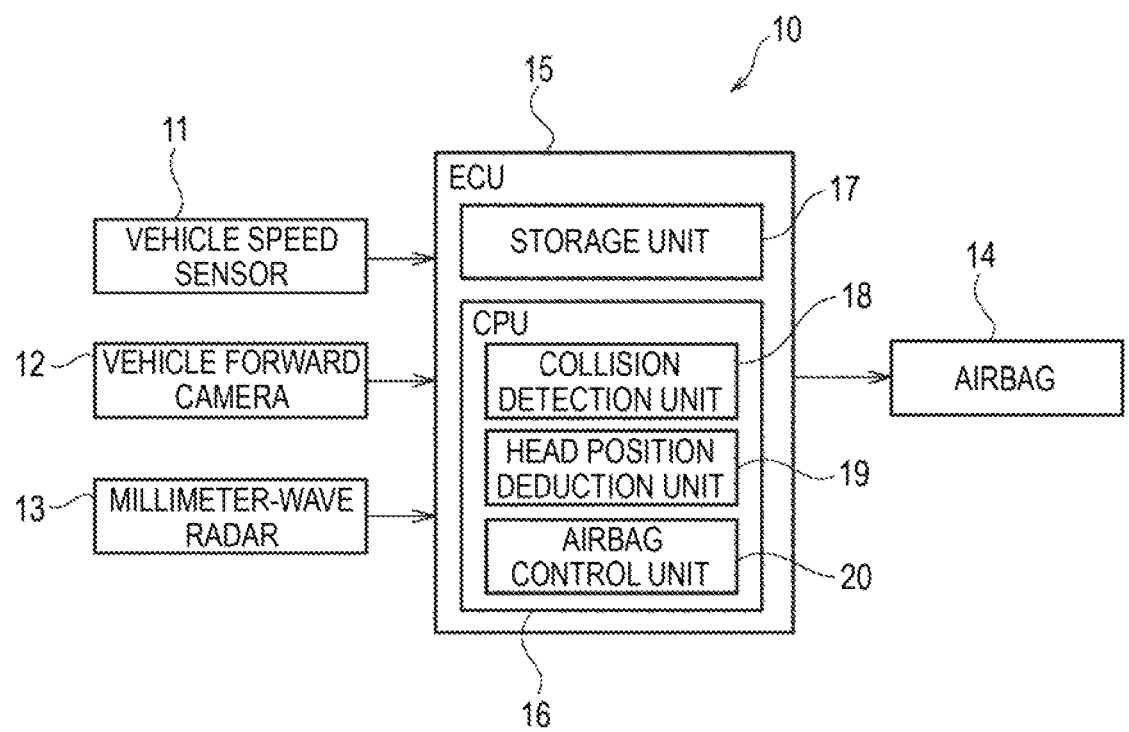

[FIG. 3]
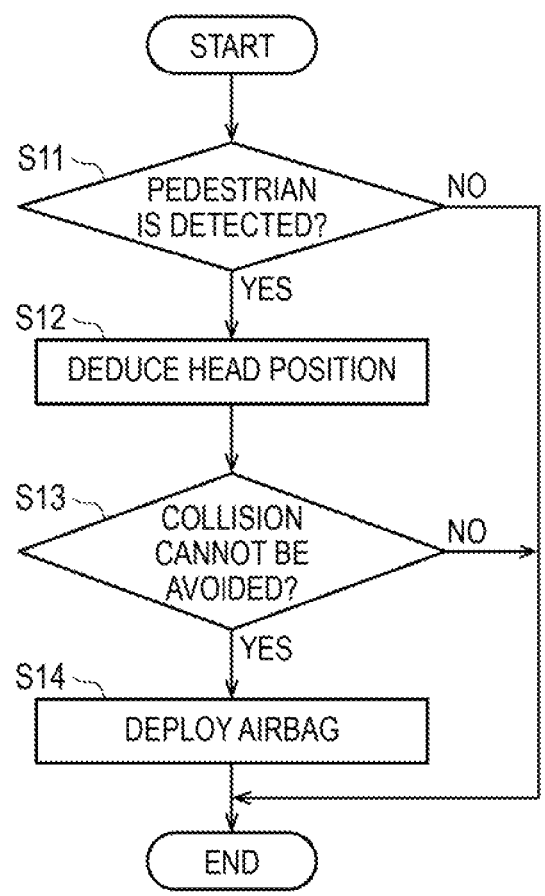

[FIG. 4A]
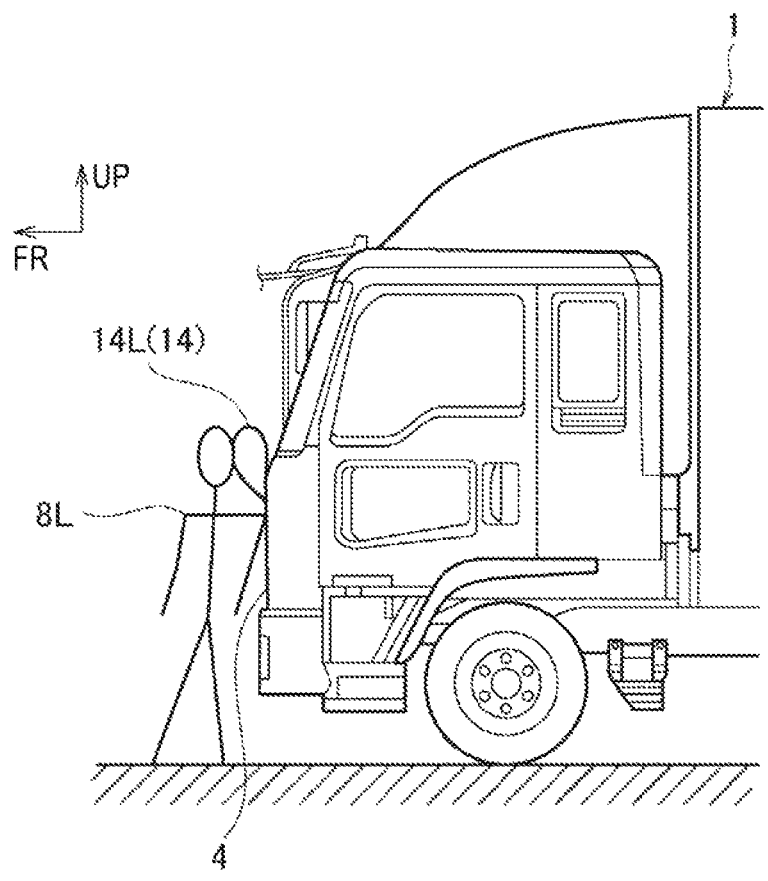
[FIG. 4B]
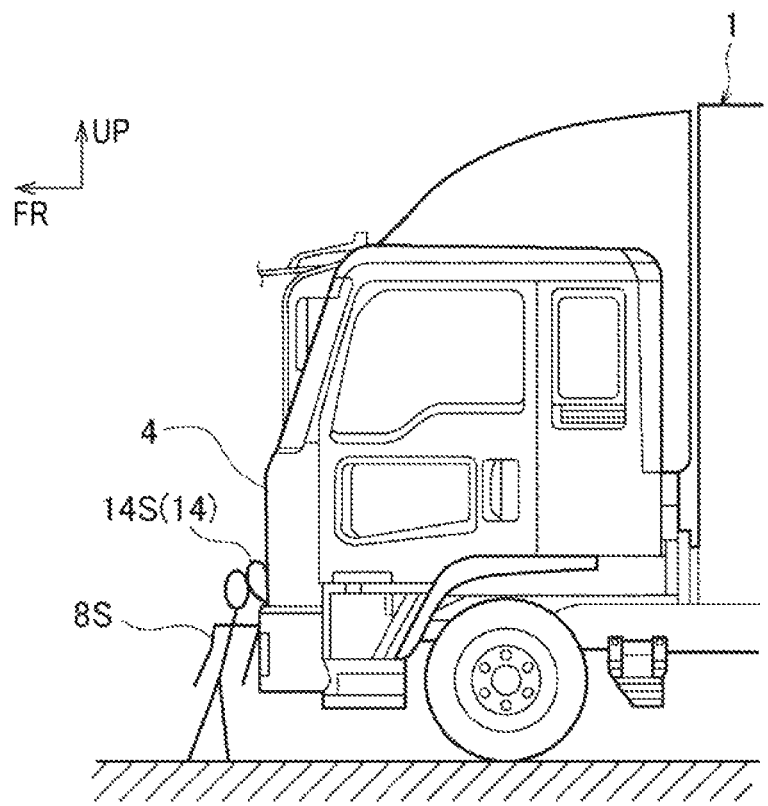

[FIG. 5]
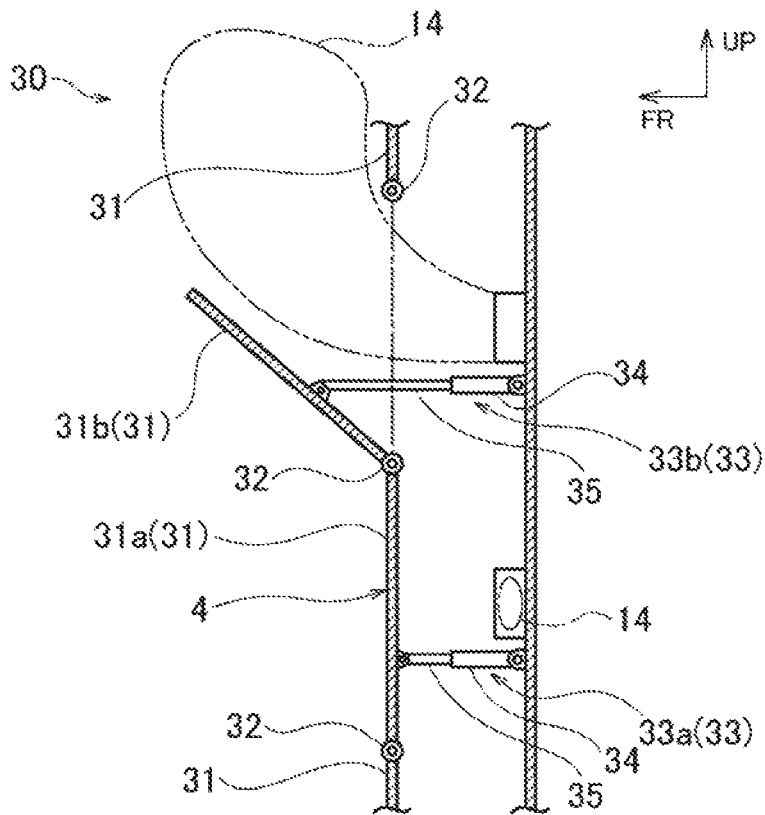
[FIG. 6]
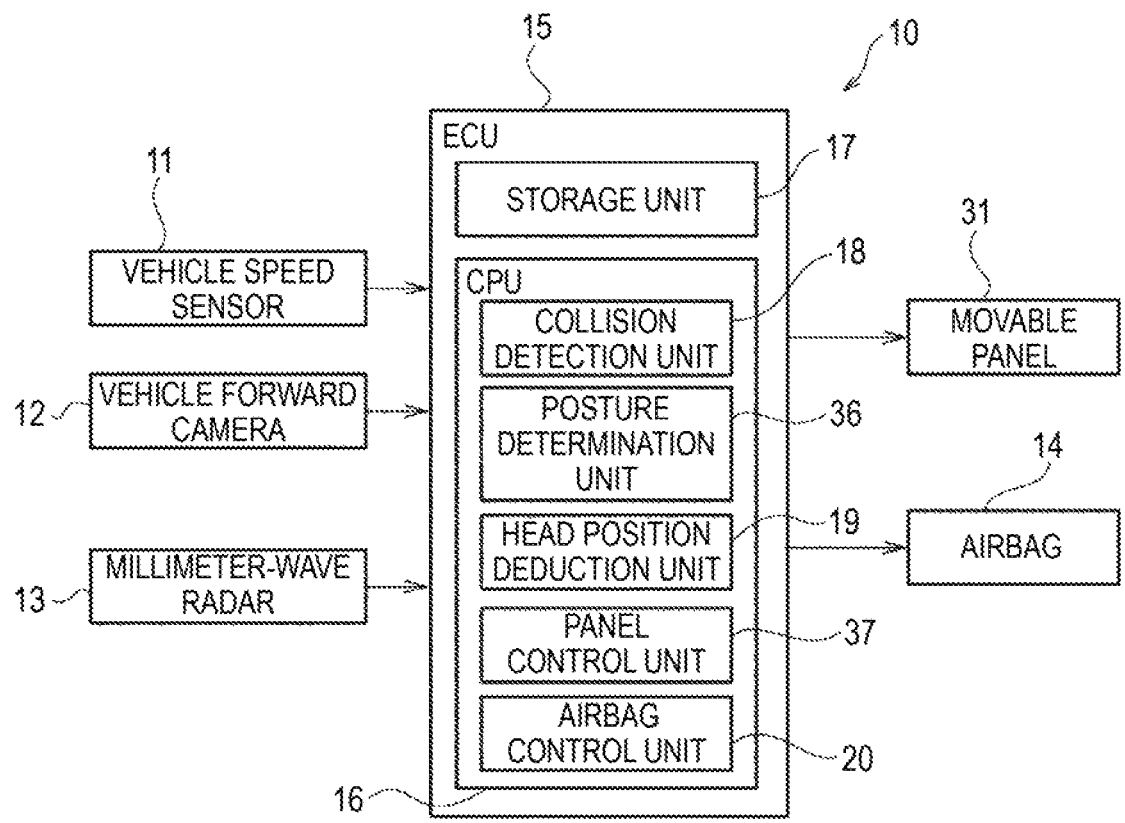

[FIG. 7A]
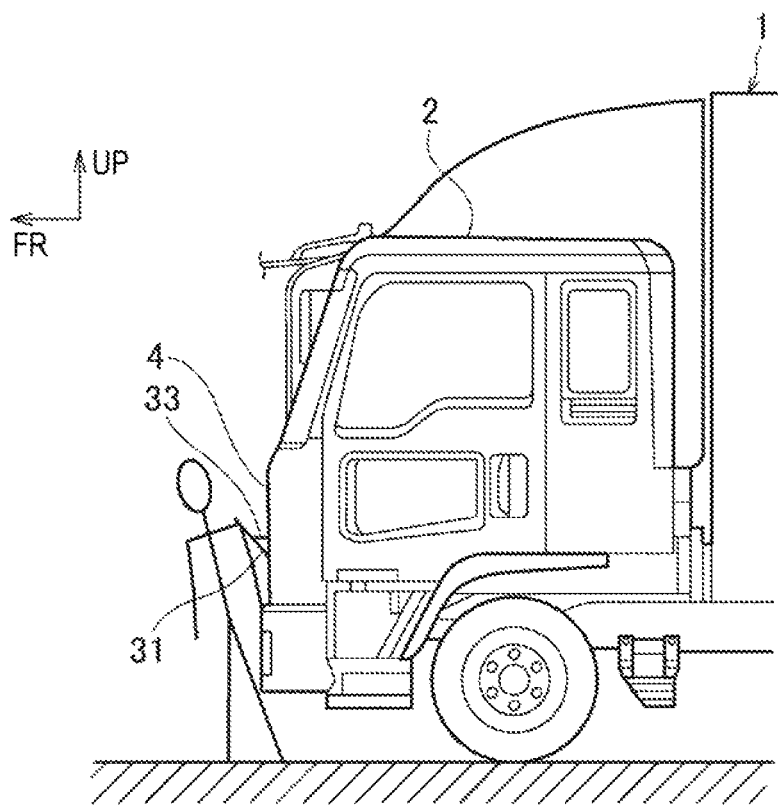
[FIG. 7B]
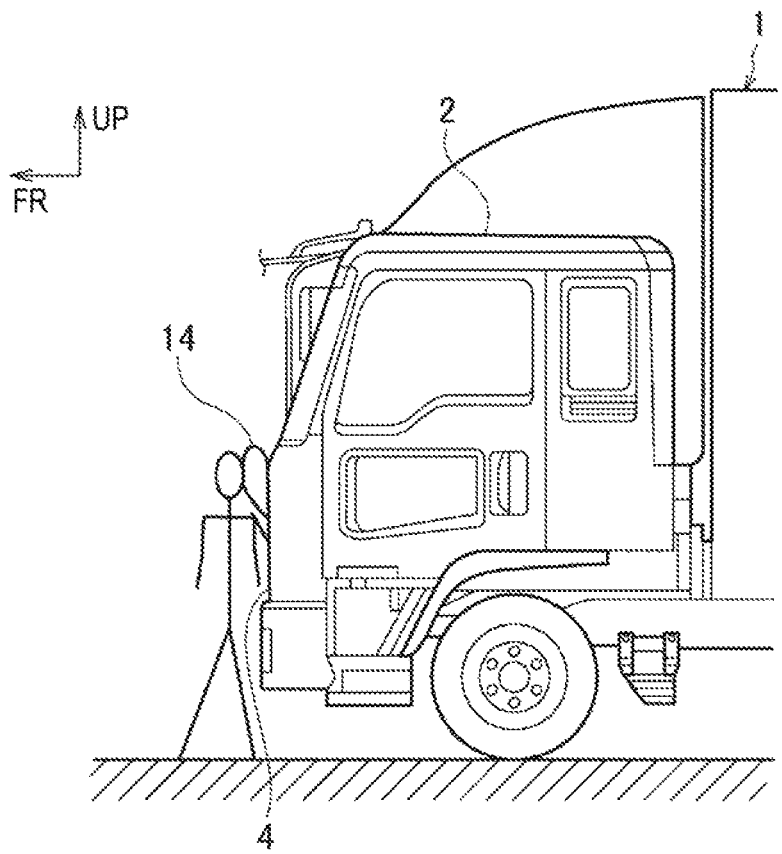

[FIG. 8A]
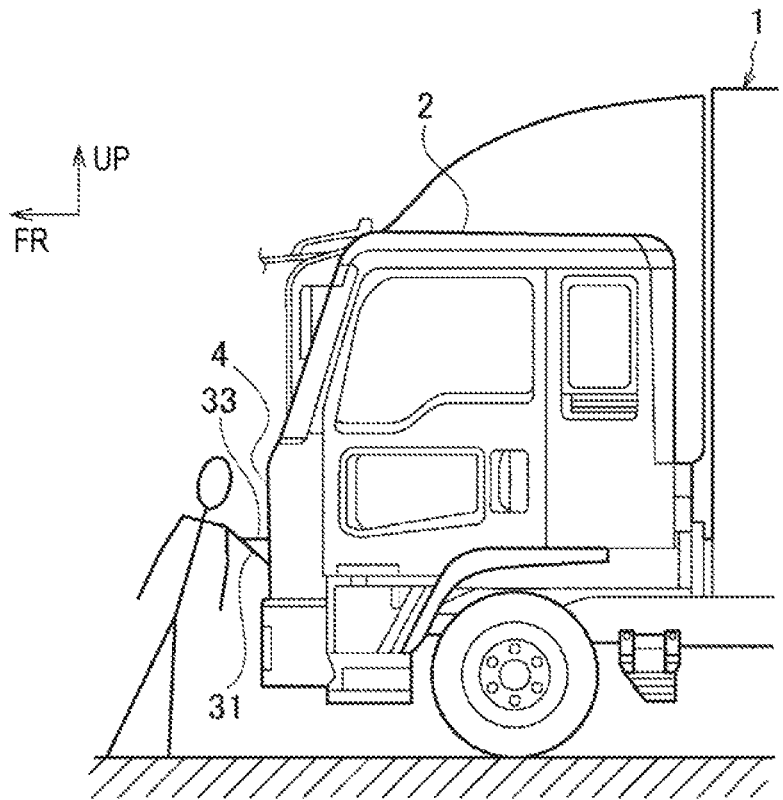
[FIG. 8B]
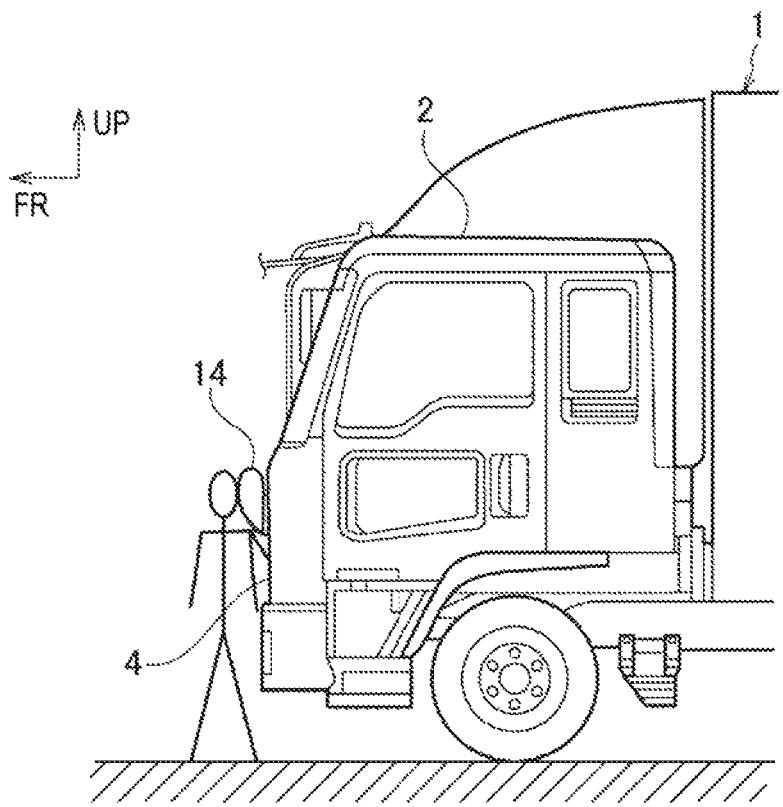

[FIG. 9]
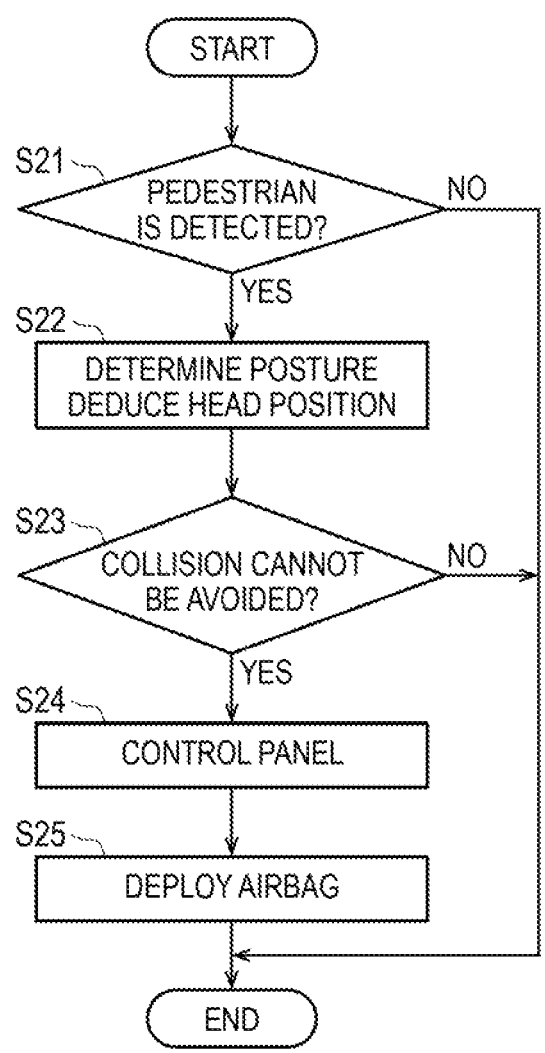

PEDESTRIAN PROTECTION DEVICE FOR VEHICLE

CROSS-REFERENCE TO RELATED APPLICATIONS

This application is a U.S. National Stage entry of PCT Application No: PCT/JP2018/034348 filed on Sep. 18, 2018, which claims priority to Japanese Patent Application No. 2017-179385, filed Sep. 19, 2017, the contents of which are incorporated herein by reference.

TECHNICAL FIELD

The present disclosure relates to a pedestrian protection device for a vehicle for protecting a pedestrian upon a collision with the pedestrian.

BACKGROUND ART

PTL 1 discloses an automobile airbag device for a pedestrian. When an automobile contacts a pedestrian or the like and an inflator is thus actuated, an airbag of the airbag device for a pedestrian covers a cowl, a rear part of a hood panel and a front part of a windshield to prevent the pedestrian or the like from directly colliding with the cowl and the like.

CITATION LIST

Patent Literature

PTL 1: JP-A-2016-168995

SUMMARY OF INVENTION

Technical Problem

Since heights of the pedestrians who collide with a vehicle vary from children to adults, a range of positions of the vehicle with which the pedestrian may collide is wide. For this reason, in order to protect the pedestrians of different heights, it is considered to deploy the airbag over a wide range in front of the vehicle. However, in a case of a cap-over type vehicle such as a truck, a front face pan of the vehicle below a front window is upright. Therefore, when the airbag is deployed over a wide range in front of the front face part of the vehicle, the airbag being deployed may hit a body earlier than a head of the pedestrian, so that the airbag being deployed may bounce forward the pedestrian's body.

It is therefore an object of the present disclosure to provide a pedestrian protection device for a vehicle capable of suppressing a pedestrian front being bounced forward and favorably protecting pedestrians of different heights, upon a collision with the pedestrian.

Solution to Problem

In order to solve the above-described problem, one aspect of the present disclosure is a pedestrian protection device for a vehicle having a front face part of a vehicle upright below a front window, the pedestrian protection device comprising: head position detection means for detecting a pedestrian in front of the vehicle and detecting a pedestrian's head height position; collision detection means for detecting a collision between the pedestrian detected by the head position detection means and the front face part of the vehicle; a plurality of airbags arranged in mutually different height positions of the front face part of the vehicle, and being deployable forward from the front face part of the vehicle from an accommodated state in which the airbags are accommodated in a deflated state behind the from face part of the vehicle; and airbag control means for, when the collision detection means detects a collision, deploying, from among the plurality of airbags, an airbag that can be deployed to the pedestrian's head height position detected by the head position detection means.

In the above configuration, the plurality of airbags is arranged in the different height positions of the front face part of the vehicle. When the collision detection means detects a collision, the airbag control means deploys, among the plurality of airbags, an airbag that can be deployed to the pedestrian's head height position detected by the head position detection means. In this way, since the airbag can be deployed to the pedestrian's head height position, the heads of the pedestrians of different heights can be favorably protected.

Also, since an airbag, which can be deployed to the pedestrian's head height position, of the plurality of airbags of different height positions is deployed, it is possible to suppress the airbag being deployed from hitting the pedestrian's body, and to suppress the pedestrian's body from being bounced toward the front of the vehicle due to the airbag being deployed.

Also, since the airbag is deployed to the pedestrian's head height position, when the front face part of the vehicle and the pedestrian's body (particularly, a side of the pedestrian's body) collide with each other, it is possible to fill a space between the pedestrian's head and the front face part of the vehicle by the airbag. For this reason, since it is possible to suppress the pedestrian's neck from being bent upon the collision, it is possible to favorably protect the pedestrian's head and neck.

The second aspect of the present disclosure is the pedestrian protection device for a vehicle according to the first aspect, wherein a protruding amount of an airbag of the plurality of airbags that is below a predetermined height position upon forward deployment from the front face part of the vehicle is smaller than that of an airbag above the predetermined height position.

In the above configuration, the protruding amount of the airbag, which is located below the predetermined height position, of the plurality of airbags upon the forward deployment from the front face part of the vehicle is smaller than the airbag located above the predetermined height position. For this reason, when the vehicle collides with the pedestrian, in a case in which the vehicle collides with a relatively tall adult, an airbag of which a forward protruding amount from the front face part of the vehicle is large can be deployed, and in a case in which the vehicle collides with a relatively short child, an airbag of which a forward protruding amount from the front face part of the vehicle is small can be deployed. Thereby, it is possible to favorably suppress the pedestrian's neck from being bent and to favorably protect the pedestrian's head, in accordance with the pedestrian's height.

The third aspect of the present disclosure is the pedestrian protection device for a vehicle according to the first or second aspect, further comprising: before-collision detection means for detecting a state before a collision, in which it is not possible to avoid a collision of the pedestrian with the front face part of the vehicle, before the collision detection means detects the collision of the pedestrian with the front face part of the vehicle: posture detection means configured to detect: a forward tilted state in which a pedestrian's head in front of the vehicle is arranged further forward than a leg; and a backward tilted state in which the pedestrian's head in front of the vehicle is arranged further backward than the leg; a posture correction member, which is arranged in a height position below a deployment area of at least one airbag of the plurality of airbags, and which is supported to a vehicle body-side so as to be movable in a front and rear direction between; a usual position in which the posture correction member does not protrude forward from the front face part of the vehicle; and an operation position in front of the front face part of the vehicle and below the deployment area; and correction member control means for controlling the posture correction member, wherein when the before-collision detection means detects the state before a collision, the correction member control means is configured to; in a case the posture detection means detects the forward tilted state, perform a forward tilted posture correction control; and in a case the posture detection means detects the backward tilted state, perform a backward tilted posture correction control, wherein the forward tilted posture correction control comprises a control of approximating a pedestrian's posture to a substantially upright state in which the pedestrian is not inclined in the front and rear direction by moving the posture correction member from the usual position to the operation position and permitting backward movement of the posture correction member from the operation position due to contact with the pedestrian while absorbing energy, and wherein the backward tilted posture correction control comprises a control of approximating a pedestrian's posture to the substantially upright state by moving the posture correction member from the usual position to the operation position and restricting backward movement of the posture correction member from the operation position due to contact with the pedestrian for a predetermined time In the above configuration, the posture correction member is arranged in the height position below the deployment area of the airbag. Therefore, when the pedestrian's head is located at the height position of the airbag, the posture correction member is located in a height position of the body below the pedestrian's head. In the state before a collision (before a collision between the front face part of the vehicle and the pedestrian), the correction member control means moves the posture correction member from the usual position to the operation position. Therefore, before the pedestrian collides with the front face part of the vehicle, the body contacts the posture correction member in the operation position. When the pedestrian's posture is in the forward tilted state, the correction member control means performs the forward tilted posture correction control, and when the pedestrian's posture is in the backward tilted state, the correction member control means performs the backward tilted posture correction control, so that the pedestrian's posture is approximated to the upright state.

In this way, since the pedestrian's posture can be approximated to the upright state before a collision with the vehicle, the pedestrian's body collides with the front face part of the vehicle after being approximated to the upright state, so that the airbag can be deployed between the front face part of the vehicle and the head. For this reason, unlike a case in which the pedestrian collides with the front face part of the vehicle at the forward tilted posture, it is possible to suppress the pedestrian's neck from being bent upon the collision. Also, unlike a case in which the pedestrian collides with the front face part of the vehicle at the backward tilted posture, it is possible to suppress the head from colliding with the front face part of the vehicle earlier than the pedestrian's body. Therefore, upon the collision, it is possible to suppress the pedestrian's neck from being bent and to favorably protect the pedestrian's head and neck by filling the space between the pedestrian's head and the front face part of the vehicle with the airbag.

The fourth aspect of the present disclosure is the pedestrian protection device for a vehicle according to the third aspect, wherein a rear surface of the posture correction member is provided with an actuator that is extendable, wherein the actuator connects the rear surface of the posture correction member and a vehicle body-side behind the front face part of the vehicle each other, and wherein the posture correction member is supported to the vehicle body-side such that the posture correction member is swingable between the usual position and the operation position about a shaft as the actuator extends, the shaft extending in a vehicle width direction in a position corresponding to a lower end portion of the posture correction member.

The all aspect of the disclosure is the pedestrian protection device for a vehicle according to the fourth aspect, wherein the actuator comprises; a cylinder that is extendable; and a piston supported to the cylinder so as to be slidable, wherein the cylinder has: one end supported to a vehicle bode-side behind the front face part of the vehicle and; the other end from which the piston protrudes, and wherein a tip end portion of the piston is coupled to the rear surface of the posture correction member.

The sixth aspect of the disclosure is the pedestrian protection device for a vehicle according to any one of the third to fifth aspects, wherein the posture correction member is long in a vehicle width direction, wherein the posture correction member is provided in plural, and wherein the plurality of the posture correction members is arranged side by side vertically to configure the front face part of the vehicle having a substantially planar shape.

Advantageous Effects of Invention

According to the present disclosure, it is possible to suppress the pedestrian from being bounced forward and to favorably protect pedestrians of different heights, upon the collision with the pedestrian.

BRIEF DESCRIPTION OF DRAWINGS

FIG. 1 is a schematic perspective view of a vehicle to which a pedestrian protection device in accordance with a first embodiment of the present disclosure is applied.

FIG. 2 is a block diagram of a pedestrian protection device in accordance with the first embodiment of the present disclosure.

FIG. 3 is a flowchart of the pedestrian protection device shown in FIG. 2.

FIG. 4A illustrates the pedestrian protection device shown in FIG. 2, depicting a collision state with a tall pedestrian.

FIG. 4B illustrates the pedestrian protection device shown in FIG. 2, depicting a collision state with a short pedestrian.

FIG. 5 is a schematic perspective view of a pedestrian protection device in accordance with a second embodiment of the present disclosure.

FIG. 6 is a block diagram of the pedestrian protection device shown in FIG. 5.

FIG. 7A illustrates a collision with a pedestrian in a forward tilted state, depicting a state before posture correction.

FIG. 7B illustrates the collision with the pedestrian in the forward tilted state, depicting a state after posture correction.

FIG. 8A illustrates a collision with a pedestrian in a backward tilted state, depicting a state before posture correction.

FIG. 8B illustrates the collision with the pedestrian in the backward tilted state, depicting a state after posture correction.

FIG. 9 is a flowchart of the pedestrian protection device shown in FIG. 5.

DESCRIPTION OF EMBODIMENTS

Hereinbelow, a first embodiment of the present disclosure will be described with reference to the drawings. In the respective drawings, a reference sign FR indicates a front of the vehicle, a reference sign UP indicates an upper, and a reference sign IN indicates an inner side in a vehicle width direction. Also, in descriptions below, a right and left direction means a right and left direction in a state facing the front of the vehicle.

As shown in FIG. 1, a vehicle 1 to which a pedestrian protection device 10 of the present embodiment is mounted is a cap-over type truck of which a cap 2 is arranged substantially above an engine (not shown), and a front face part 4 of the vehicle below a front window 3 is upright.

The front face part 4 of the vehicle has a plurality of panels 6 each of which is long in the vehicle width direction. The plurality of panels 6 is arranged side by side with being adjacent to each other vertically to configure the front face part 4 of the vehicle having a substantially planar shape, and is detachably supported to a vehicle body-side behind the front face part 4 of the vehicle. In the meantime, the plurality of panels 6 may not be adjacent to each other vertically.

As shown in FIGS. 1 and 2, the pedestrian protection device 10 includes a vehicle speed sensor 11, a vehicle forward camera 12, a millimeter-wave radar 13, a plurality of airbags 14, and an ECU (Electric Control Unit) 15.

The vehicle speed sensor 11 is configured to sequentially detect a speed of the vehicle 1, and to output a signal including the detected information to the ECU 15.

The vehicle forward camera 12 is provided at an upper part of the front window 3, and is configured to sequentially capture a moving picture within a predetermined angle range in front of the vehicle 1, to digitally convert still images configuring the captured moving picture and to output the same to the ECU 15, as moving picture information.

The millimeter-wave radar 13 is provided in a bumper 5 at a lower part of a front face of the cap 2, and is configured to repeatedly transmit transmission waves that are continuous electromagnetic waves in a millimeter wave band from the front face of the cap 2 toward the front within the predetermined angle range every predetermined time, and to receive reception waves that are reflected waves from an object (including a pedestrian) in front of the vehicle 1. The millimeter-wave radar 13 is configured to sequentially detect a distance from the front face of the cap 2 to the object, an elevation/depression angle, and an azimuth angle based on the from and rear direction, and to output a signal, including the detected information to the ECU 15.

The plurality of airbags 14 is airbags that are long in the vehicle width direction, is respectively arranged in a deflated state behind the respective panels 6 of the front face part 4 of the vehicle, and is supported to a vehicle body-side behind the front face part 4 of the vehicle. That is, the same number of airbags 14 as the panels 6 are provided behind the front face part 4 of the vehicle. The plurality of airbags 14 is arranged in different height positions. Each of the airbag 14 is provided with an inflator (not shown). When the inflator is actuated, the airbag 14 is inflated and deployed forward by a gas generated from the inflator. When the airbags 14 are deployed forward, the airbags 14 start to inflate behind the panels 6 of the front face part 4 of the vehicle, press forward the panels 6 to separate the panels forward from the vehicle body-side, and are then deployed forward from the front face part 4 of the vehicle. The deployed airbags 14 extend in the vehicle width direction with being inflated in respective deployment areas in front of the front face part 4 of the vehicle. A vertical length of the deployed airbag 14 is set longer than a vertical length of at least a pedestrian's head. Among the plurality of airbags 14, an airbag 14S below a predetermined height position (a position shown with a dashed-dotted line 7 in FIG. 1) is configured so that a forward protruding amount thereof from the front face part 4 of the vehicle in the deployed state is smaller than a protruding amount of an airbag 14L above the predetermined height position (refer to FIG. 4A and FIG. 4B). In the meantime, a size that favorably fills a space between the front face part 4 of the vehicle and the head when an adult's body collides with the front face part 4 of the vehicle from diverse directions (including the front, the back and the side) is obtained by a test, a simulation or the like, and the obtained size is set as a site of the airbag 14L (a protruding amount and a vertical length). Also, a size that favorably fills the space between the front face part 4 of the vehicle and the head when a child's body collides with the front face part 4 of the vehicle from diverse directions (including a front, a back and a side) is obtained by a test, a simulation or the like, and the obtained size is set as a size of the airbag 14S (a protruding amount and a vertical length).

As shown in FIG. 2, the ECU 15 includes a CPU (Central Processing Unit) 16 and a storage unit 17. The storage unit 17 includes a ROM (Read Only Memory) and a RAM (Random Access Memory), which are not shown.

In the ROM of the storage unit 17, a variety of programs (including a pedestrian protection program) and data (including data about height positions of the plurality of airbags 14) that are read out by the CPU 16 are stored in advance. In the meantime, the diverse data that is stored in the ROM is set based on measured values obtained by a test, a simulation or the like or theoretical values. Also, the data may be stored with being included in the program.

In the RAM of the storage unit 17, a data storage area in which diverse detection data of the vehicle speed sensor 11, the vehicle forward camera 12 and the millimeter-wave radar 13 is stored is preset. Also, the RAM functions not only as a temporary storage area for the diverse detection data but also as a development area for a program read out from the ROM and a temporary storage area for a calculation result of the CPU 16.

The CPU 16 includes a collision detection unit 18, a head position deduction unit 19, and an airbag control unit (airbag control means) 20, and is configured to execute pedestrian protection processing in accordance with a pedestrian protection program stored in the storage unit 17, thereby functioning as a collision detection means, a head position detection means, and an airbag control means. Also, the CPU 16 is configured to store the diverse detection data in the storage unit 17, and reads out the diverse detection data and the like from the storage unit 17 when executing the pedestrian protection processing. In the meantime, some of the functions of the CPU 16 may be extracted and provided in another information processing device.

When a pedestrian in front of the vehicle 1 is detected from the information provided by the vehicle forward camera 12, the head position deduction unit 19 calculates a height of the pedestrian from a road surface from the information provided by the vehicle forward camera 12 and the millimeter-wave radar 13, thereby deducing a pedestrian's head height position. That is, the vehicle forward camera 12, the millimeter-wave radar 13, and the head position deduction unit 19 function as a head position detection means for deducing a pedestrian's head height position to detect a height position of the head.

When the pedestrian in front of the vehicle 1 is detected from the in provided by the vehicle forward camera 12, the collision detection unit 18 calculates a time-to-collision TTC (Time To Collision) with respect to the pedestrian from the information provided by the millimeter-wave radar 13 and the vehicle speed sensor 11. When the calculated time-to-collision TTC is smaller than a preset threshold value, the collision detection unit 18 determines that it is a state before a collision in which it is not possible to avoid a collision between the vehicle 1 and the pedestrian. After determining that it is the state before a collision, when the time-to-collision TTC elapses, the collision detection unit 18 detects a collision between the vehicle 1 and the pedestrian. That is, the vehicle forward camera 12, the millimeter-wave radar 13, the vehicle speed sensor 11, and the collision detection unit 18 function as before-collision detection means for detecting a state before a collision, and a collision detection means for detecting a collision between the front face part 4 of the vehicle 1 and the pedestrian. In the meantime, the time-to-collision TTC is calculated by substituting a distance L(m) between the vehicle 1 and the pedestrian and a relative speed RV(m/s) into a following equation (1). Also, a value of the time-to-collision TTC at which it is not possible to avoid a collision between the vehicle 1 and the pedestrian is obtained by a test, simulation or the like, and the obtained value is set as the threshold value of the time-to-collision TTC.

$$TTC=L/RV \quad (1)$$

In the equation (1), TTC is a time-to-collision, L is a distance between the vehicle 1 and the pedestrian, and RV is a relative speed between the vehicle 1 and the pedestrian. The distance L(m) and the relative speed RV(m/s) can be calculated from the information detected by the millimeter-wave radar 13 and the vehicle speed sensor 11.

When the collision detection unit 18 detects a collision between the vehicle 1 and the pedestrian, the airbag control unit 20 actuates the inflator of an airbag 14 (an airbag 14 that can be deployed to the pedestrian's head height position), which has a deployment area in the pedestrian's head height position deduced by the head position deduction unit 19, of the plurality of airbags 14, thereby deploying the airbag 14.

Subsequently, the pedestrian protection processing that is executed by the ECU 15 is described with reference to a flowchart of FIG. 3. The processing starts upon a start of the vehicle 1, and is repeatedly executed every predetermined time.

When the present processing starts, the head position deduction unit 19 detects whether or not a pedestrian in front of the vehicle 1 from the information provided by the vehicle forward camera 12 (step S11). When the head position deduction unit 19 detects a pedestrian in front of the vehicle 1 (step S11: YES), the processing proceeds to step S12. On the other hand, when the head position deduction unit 19 does not detect a pedestrian in front of the vehicle 1 (step S11: NO), the processing is over.

In step S12, the head position deduction unit 19 deduces a height position of the head of the detected pedestrian, and the processing proceeds to step S13.

In step S13, the collision detection unit 18 calculates a time-to-collision TTC, and determines whether it is a state before a collision in which it is not possible to avoid a collision between the vehicle 1 and the pedestrian, based on the calculated time-to-collision TTC. When the collision detection unit 18 determines that it is a state before a collision (step S13: YES), the processing proceeds to step S14. On the other hand, when the collision detection unit 18 determines that it is not a state before a collision (step S13: NO), the processing is over.

In step S14, after the time-to-collision TTC calculated by the collision detection unit 18 in step S13 elapses, the airbag control unit 20 deploys an airbag 14 that can be deployed to the pedestrian's head height position, and the processing is over.

In the pedestrian protection device 10 configured as described above, the plurality of airbags 14 is arranged in the different height positions of the front face part 4 of the vehicle, and when the collision detection unit 18 detects a collision, the airbag control unit 20 deploys the airbag 14, which can be deployed to the pedestrian's head height position detected by the head position deduction unit 19, of the plurality of airbags 14. For example, in a case in which an adult pedestrian 8L taller than a child collides with the front face part 4 of the vehicle 1, as shown in FIG. 4A, the head position deduction unit 19 deduces the height position of the head of the pedestrian 8L, and when the collision detection unit 18 detects the collision with the pedestrian 8L, the airbag control unit 20 deploys the airbag 14L that can be deployed to the height position of the head of the pedestrian 8L. On the other hand, in a case in which a child pedestrian 8S shorter than an adult collides with the front face part 4 of the vehicle 1, as shown in FIG. 4B, the head position deduction unit 19 deduces the height position of the head of the pedestrian 8S, and when the collision detection unit 18 detects the collision with the pedestrian 8S, the airbag control unit 20 deploys the airbag 14S that can be deployed to the height position of the head of the pedestrian 8S. In this way, the pedestrian protection device 10 can favorably protect the heads of the pedestrian of different heights.

Also, since the airbag 14, which can be deployed to the pedestrian's head height position, of the plurality of airbags 14 of different height positions is deployed, it is possible to suppress the airbag 14 being deployed from hitting the pedestrian's body, and to suppress the pedestrian's body from being bounced toward the front of the vehicle 1 by the airbag 14 being deployed.

Also, since the airbag 14 that can be deployed to the pedestrian's head height position is deployed, when the front face part 4 of the vehicle and the pedestrian's body (particularly, a side of the pedestrian's body) collide with each other, it is possible to fill a space between the pedestrian's head and the front face part 4 of the vehicle by the airbag 14 (refer to FIG. 4A and FIG. 4B). For this reason, since it is possible to suppress the pedestrian's neck from being bent upon the collision, it is possible to favorably protect the pedestrian's head and neck.

Also, among the plurality of airbags 14, the size of the airbag 14L above the predetermined height position is set as a size by which it is possible to favorably fill the space between the front face part 4 of the vehicle and the head when the adult's body collides with the front face part 4 of the vehicle, and the size of the airbag 14S below the predetermined height position is set as a size by which it is possible to favorably fill the space between the front face part 4 of the vehicle and the head when the child's body collides with the front face part 4 of the vehicle. For this reason, it is possible to favorably suppress the pedestrian's neck from being bent and to favorably protect the pedestrian's head, in accordance with the pedestrian's height.

Therefore, according to the present embodiment, it is possible to suppress the pedestrian from being bounced forward upon the collision with the pedestrian, and to favorably protect the pedestrians of different heights.

In the meantime, in the present embodiment, when the time-to-collision TTC is smaller than the preset threshold value, the collision detection unit 18 determines that it is the state before a collision in which it is not possible to avoid the collision between the vehicle 1 and the pedestrian, and after determining that it is the state before a collision, when the time-to-collision TTC elapses, the collision detection unit 18 detects indirectly the collision between the vehicle 1 and the pedestrian. However, the method of detecting the collision between the vehicle 1 and the pedestrian is not limited thereto. For example, an acceleration sensor may be provided on the front face part 4 of the vehicle, and the acceleration sensor and the collision detection unit 18 may be configured to function as the collision detection means so that the collision detection unit 18 is to detect the direct collision of the pedestrian with the front face part 4 of the vehicle from information provided by the acceleration sensor. In this case, the before-collision detection means for detecting the state before a collision may not be provided.

Subsequently, a second embodiment of the present disclosure is described with reference to the drawings. A pedestrian protection device 30 of the present embodiment is different from the first embodiment, in that it is possible to correct a pedestrian's posture before a collision with the pedestrian. In the meantime, the similar configurations to the first embodiment are denoted with the same reference signs, and the descriptions thereof are omitted.

As shown in FIG. 5, the front face part 4 of the vehicle has a plurality of movable panels (posture correction member) 31 that is long in the vehicle width direction. The plurality of movable panels 31 is arranged side by side with being adjacent to each other vertically, thereby configuring the front face part 4 of the vehicle having a substantially planar shape. A lower end portion of each movable panel 31 is supported so as to be freely tillable toward the vehicle body-side about a shall 32 extending in the vehicle width direction. The movable panel 31 can be tilted between a usual position (a position of the movable panel 31a in FIG. 5) in which the movable panel is upright upward from the shaft 32-side along a substantially vertical direction and does not protrude forward from the front face part 4 of the vehicle, and an operation position (a position of the movable panel 31b in FIG. 5) in which an upper end side of the movable panel is tilted forward and protrudes forward from the front face part 4 of the vehicle. A rear surface of the movable panel 31 is provided with an actuator 33. The actuator 33 has a cylinder 34, and a piston 35 slidably supported to the cylinder 34, and can extend as an air is supplied into the cylinder 34 via a valve (not shown). The cylinder 34 has one end supported to a vehicle body-side behind the front face part 4 of the vehicle, and the other end from which the piston 35 protrudes. A tip end portion of the piston 35 is coupled to the rear surface of the movable panel 31. In a state in which the movable panel 31 is arranged in the usual position, the actuator 33 holds the movable panel 31 in the usual position in a contracted state (a state of the actuator 33a in FIG. 5). When the air is supplied into the cylinder 34 of the actuator 33, the actuator 33 extends (a state of the actuator 33b in FIG. 5), so that the movable panel 31 is moved to the operation position. When the valve (not shown) of the actuator 33 is closed in a state in which the movable panel 31 is arranged in the operation position, the air in the cylinder 34 of the actuator 33 is restricted from being discharged, so that the movable panel 31 is held in the operation position and the movable panel 31 is restricted from moving backward. Also, when the valve of the actuator 33 is slightly opened in the state in which the movable panel 31 is arranged in the operation position, the discharge of the air in the cylinder 34 of the actuator 33 is permitted, so that movement of the movable panel 31 from the operation position toward the rear usual position is permitted. Thus, when the movable panel 31 is pressed backward, the movable panel 31 is gradually moved backward while absorbing energy. Also, when the valve of the actuator 33 is largely (for example, completely) opened in the state in which the movable panel 31 is arranged in the operation position, the discharge of the air in the cylinder 34 of the actuator 33 is permitted, and movement of the movable panel 31 from the operation position toward the rear usual position is permitted. Thus, when the movable panel 31 is pressed backward, the movable panel 31 is easily moved to the usual position. In the meantime, the plurality of movable panels 31 may not be adjacent to each other vertically.

The plurality of airbags 14 is respectively arranged in the deflated state behind each of the plurality of movable panels 31, and is supported to the vehicle body-side behind the front face part 4 of the vehicle. That is, the same number of the airbags 14 as the movable panels 31 are provided behind the front face part 4 of the vehicle. In a state in which the movable panel 31 in front of the airbag 14 is arranged in the operation position, the airbag 14 is deployed toward an area (deployment area) above the movable panel 31 located in the operation position. That is, the movable panel 31 is arranged in a height position below the deployment area of the airbag 14 behind the movable panel, and is supported to the vehicle body-side so that it can be tilted forward and backward between the usual position in which it does not protrude forward from the front face part 4 of the vehicle and the operation position in front of the front face part 4 of the vehicle and below the deployment area of the airbag 14.

As shown in FIG. 6, the ECU 15 includes the CPU 16 and the storage unit 17.

The CPU 16 includes the collision detection unit 18, a posture determination unit 36, the head position deduction unit 19, a panel control unit. (a correction member control means) 37, and the airbag: control unit 20, and is configured to execute the pedestrian protection processing in accordance with the pedestrian protection program stored in the storage unit 17, thereby functioning as the collision detection means, a posture determination means, the head position detection means, a panel control means, and the airbag control means. In the meantime, some of the functions of the CPU 16 may be extracted and provided in another information processing device.

When a pedestrian in front of the vehicle 1 is detected from the information provided by the vehicle forward camera 12, the posture determination unit 36 calculates a distance from the front face of the vehicle 1 to an upper end portion (a head) of the pedestrian (hereinbelow, simply referred to as 'distance to the head') and a distance from the front face of the vehicle 1 to a lower end portion (a leg) of the pedestrian (hereinbelow, simply referred to as 'distance to the leg') from the information provided by the vehicle forward camera 12 and the millimeter-wave radar 13. The posture determination unit 36 compares the calculated distance to the head of the pedestrian and the distance to the leg. When the distance to the head is longer by a predetermined distance or greater, the posture determination unit 36 determines that it is a forward tilted state (a state shown in FIG. 7A) in which the pedestrian's head is located further forward (distant) than the leg, when the distance to the leg is longer by the predetermined distance or greater, the posture determination unit 36 determines that it is a backward tilted state (a state shown in FIG. 8A) in which the pedestrian's head is located further backward (close) than the leg, and when a difference between the distance to the head and the distance to the leg is smaller than the predetermined distance, the posture determination unit 36 determines that it is a substantially upright state in which the difference between the distance to the head and the distance to the leg is small. That is, the vehicle forward camera 12, the millimeter-wave radar 13, and the posture determination unit 36 function as a posture detection means that can detect the forward tilted state and the backward tilted state of the pedestrian in front of the vehicle 1.

At a time when the collision detection unit 18 detects the state before a collision with the pedestrian, if the posture determination unit 36 determines that the pedestrian's posture is in the forward tilted state, the panel control unit 37 performs a forward tilted posture correction control (which will be described later) on the movable panel 31 in front of the airbag 14 that can be deployed to the pedestrian's head height position deduced by the head position deduction unit 19, and if the posture determination unit 36 determines that the pedestrian's posture is in the backward tilted state, the panel control unit 37 performs a backward tilted posture correction control (which will be described later) on the movable panel 31 in front of the airbag 14 that can be deployed to the pedestrian's head height position deduced by the head position deduction unit 19.

Subsequently, the forward tilted posture correction control and the backward tilted posture correction control that are executed by the panel control unit 37 are described with reference to FIG. 5, FIG. 7A, FIG. 7B, FIG. 8A and FIG. 8B.

As shown in FIG. 5, FIG. 7A, and FIG. 7B, the forward tilted posture correction control is a control of approximating a pedestrian's posture (forward tilted posture), which is in the forward tilted state (a state shown in FIG. 7), to an upright state (a state shown in FIG. 7B) before a body (shoulder or chest) immediately below the pedestrian's head collides with the front face part 4 of the vehicle. At a time when the collision detection unit 18 detects the state before a collision with the pedestrian, if the posture determination unit 36 determines that the pedestrian's posture is in the forward tilted state, the panel control unit 37 supplies the air into the cylinder 33 of the actuator 33 to extend the actuator 33 and to move the movable panel 31 to the operation position, and slightly opens the valve (not shown) of the actuator 33, before the pedestrian collides with the front face part 4 of the vehicle. Since the movable panel 31 in the operation position is located below the deployment area of the airbag 14, the movable panel 31 is contacted to the body (shoulder or chest) immediately below the pedestrian's head (refer to FIG. 7A). When the movable panel 31 presses the pedestrian's body in a state in which a front end (upper end-side) of the movable panel 31 is in contact with the pedestrian's body, the movable panel 31 is moved backward together with the pedestrian's body while absorbing the collision energy of the pedestrian, so that the pedestrian's posture approximates to the upright state (refer to FIG. 7B).

As shown in FIG. 5, FIG. 8A, and FIG. 8B, the backward tilted posture correction control is a control or approximating a pedestrian's posture (backward tilted posture), which is in the backward tilted state (a state shown in FIG. 8A), to an upright state (a state shown in FIG. 8B) before a body of the pedestrian's head collides with the front face part 4 of the vehicle. At a time when the collision detection unit 18 detects the state before a collision with the pedestrian, if the posture determination unit 36 determines that the pedestrian's posture is in the backward tilted state, the panel control unit 37 supplies the air into the cylinder 34 of the actuator 33 to extend the actuator 33 and to move the movable panel 31 to the operation position, and closes the valve (not shown) of the actuator 33 for a predetermined time T, before the pedestrian collides with the front face part 4 of the vehicle. Since the movable panel 31 in the operation position is located below the deployment area of the airbag 14, the movable panel 31 is contacted to the body (shoulder or chest) immediately below the pedestrian's head (refer to FIG. 8A). When the movable panel 31 presses the pedestrian's body in the state in which the front end (upper end-side) of the movable panel 31 is in contact with the pedestrian's body, the movable panel 31 that is restricted from moving backward presses forward the upper part of the pedestrian's body, so that the pedestrian's posture approximates to the upright state (refer to FIG. 8B). When the predetermined time T elapses, the valve of the actuator 33 is largely (for example, completely) opened, so that the backward movement of the movable panel 31 is permitted. In the meantime, the predetermined time T for which the backward movement of the movable panel 31 is restricted is shorter than the time-to-collision TTC, and is obtained by a test or simulation.

On the other hand, at a time when the collision detection unit 18 detects the state before a collision with the pedestrian, if the posture determination unit 36 determines that the pedestrian's posture is in the substantially upright state, the panel control unit 37 moves, to the operation position, the movable panel 31 in front of the airbag 14 that can be deployed to the pedestrian's head height position deduced by the head position deduction unit 19, and permits the backward movement of the movable panel 31 from the operation position, before the pedestrian collides with the front face part 4 of the vehicle. For example, when the collision detection unit 18 detects the state before a collision with the pedestrian, the panel control unit 37 supplies the air into the cylinder 34 of the actuator 33 to extend the actuator 33 and to move the movable panel 31 to the operation position, and immediately opens largely (for example, completely) the valve (not shown) of the actuator 33.

Subsequently, the pedestrian protection processing that is executed by the ECU 15 is described with reference to a flowchart of FIG. 9. The processing starts upon a start of the vehicle 1, and is repeatedly executed every predetermined time.

When the present processing starts, the head position deduction unit 19 detects whether or not a pedestrian in front of the vehicle 1 from the information provided by the vehicle forward camera 12 (step S21). When the head position deduction unit 19 detects a pedestrian in front of the vehicle 1 (step S21: YES), the processing proceeds to step S22. On the other hand, when the head position deduction unit 19 does not detect a pedestrian in front of the vehicle 1 (step S21: NO), the processing is over.

In step S22, the head position deduction unit 19 deduces a pedestrian's head height position, the posture determination unit 36 determines a posture of the pedestrian detected by the ECU 15 in the front and rear direction, and the processing proceeds to step S23.

In step S23, the collision detection unit 18 calculates a time-to-collision TTC, and determines whether it is a state before a collision in which it is not possible to avoid a collision between the vehicle 1 and the pedestrian, based on the calculated time-to-collision TTC. When the collision detection unit 18 determines that it is a state before a collision (step S23: YES), the processing proceeds to step S24. On the other bond, when the collision detection unit 18 determines that it is not a state before a collision (step S23: NO), the processing is over.

In step S24, the panel control unit 37 performs a control corresponding to the pedestrian's posture determined by the posture determination unit 36 on the movable panel 31 in front of the airbag 14 that can be deployed to the pedestrian's head height position deduced by the head position deduction unit 19, and the processing proceeds to step S25.

In step S25, after the time-to-collision TTC calculated by the collision detection unit 18 in step S23 elapses, the airbag control unit 20 deploys the airbag 14 that can be deployed to the pedestrian's head height position, and the processing is over.

In the pedestrian protection device 30 configured as described above, since the movable panel 31 in the operation position is located below the deployment area of the airbag 14, when the panel control unit 37 moves the movable panel 31 to the operation position in the state before a collision, the pedestrian is contacted at the body (shoulder or chest) immediately below the pedestrian's head to the movable panel 31 in the operation position, before the pedestrian collides with the front face part 4 of the vehicle. Thereafter, the panel control unit 37 approximates the pedestrian's posture to the upright state.

In this way, it is possible to approximate the pedestrian's posture to the upright state before the collision with the vehicle 1. Therefore, after approximating the pedestrian's posture to the upright state, the pedestrian's body is enabled to collide with the front face part 4 of the vehicle, so that it is possible to deploy the airbag 14 between the front face part 4 of the vehicle and the pedestrian's head. For this reason, unlike a case in which the pedestrian collides with the front face part 4 of the vehicle at the forward tilted posture, it is possible to suppress the pedestrian's neck from being bent upon the collision. Also, unlike a case in which the pedestrian collides with the front face part 4 of the vehicle at the backward tilted posture, it is possible to suppress the head from colliding with the front face part 4 of the vehicle earlier than the pedestrian's body. Therefore, upon the collision, it is possible to suppress the pedestrian's neck from being bent and to favorably protect the pedestrian's head and neck by filling the space between the pedestrian's head and the front face part 4 of the vehicle with the airbag 14.

Also, when the panel control unit 37 performs the forward tilted posture correction control, it is possible to absorb the collision energy of the pedestrian by the forward tilted posture correction control, so that it is possible to reduce a damage of the pedestrian. Also, when performing the forward tilted posture correction control, even if the pedestrian's leg collides with the front face part 4 of the vehicle before the pedestrian's posture approximates to the upright state (even if the leg collides with the front face part 4 of the vehicle earlier than the pedestrian's body), it is possible to absorb the collision energy of the pedestrian by the forward tilted posture correction control, as described above, so that it is possible to reduce a damage of the pedestrian.

Also, since the airbag control unit 20 deploys the airbag 14 that can be deployed to the pedestrian's head height position, it is possible to favorably protect the heads of the pedestrians of different heights. Also, it is possible to suppress the airbag 14 being deployed from hitting the pedestrian's body, so that it is possible to suppress the pedestrian's body from being bounced toward the front of the vehicle 1 due to the airbag 1 being deployed.

Also, among the plurality of airbags 14, the airbag 14L above the predetermined height position is configured so that the forward protruding amount thereof from the front face part 4 of the vehicle in the deployed state is larger than the protruding amount of the airbag 14S below the predetermined height position. Therefore, it is possible to favorably suppress the pedestrian's neck from being bent and to favorably protect the pedestrian's head, in accordance with the pedestrian's height.

Therefore, according to the present embodiment, it is possible to suppress the pedestrian from being bounced forward and to favorably protect the pedestrians of different heights, upon the collision with the pedestrian.

In the meantime, in the present embodiment, the vehicle forward camera 12, the millimeter-wave radar 13, and the posture determination unit 36 are configured to function as the posture detection means. However, the posture detection means is not limited thereto. For example, another posture detection means may also be provided inasmuch as it can detect the forward tilted state and the backward tilted state of the pedestrian in front of the vehicle 1.

Also, in the present embodiment, the front face part 4 of the vehicle is provided with the plurality of movable panels 31, and the movable panels 31 are configured to function as the posture correction members that can protrude forward from the front face part 4 of the vehicle. However, the posture correction member is not limited thereto. For example, a posture correction member extending in the vehicle width direction and supported to the vehicle body-side so as to be freely slidable in the front and rear direction may be provided, and the posture correction member may be configured to protrude below the deployment area of the airbag 14 during the posture correction control.

Also, in the present embodiment, the movable panel (the posture correction member) 31 is moved from the usual position to the operation position by the air. However, the method of moving the posture correction member is not limited thereto, and a variety of methods may be applied. For example, the posture correction member may be moved to the operation position by a motor or a spring.

Also, the method of restricting the backward movement of the movable panel (posture correction member) 31 from the operation position for the predetermined time T during the backward tilted posture correction control is not limited to the method of closing the valve of the actuator 33, and a variety of methods may be applied. For example, a stopper member configured to restrict the backward movement of the posture correction member from the operation position may be provided, and the backward movement of the posture correction member may be restricted for the predetermined time T by the stopper member.

Also, in the present embodiment, the vehicle forward camera 12, the millimeter-wave radar 13, the vehicle speed sensor 11, and the collision detection unit 18 are configured to function as the before-collision detection means for detecting the state before a collision. However, the before-collision detection means is not limited thereto. For example, another before-collision detection means is also possible inasmuch as it can detect a state in which it is not possible to avoid a collision of the pedestrian with the front face part 4 of the vehicle.

Also, in the present embodiment, the vehicle forward camera 12, the millimeter-wave radar 13, the vehicle speed sensor 11, and the collision detection unit 11 are configured to function as the collision detection means for detecting the collision between the front face part 4 of the vehicle 1 and the pedestrian. However, the collision detection means is not limited thereto, and another collision detection means is also possible inasmuch as it is possible to detect a collision between the front face part 4 of the vehicle and the pedestrian. For example, the front face part 4 of the vehicle may be provided with an acceleration sensor, and the acceleration sensor and the collision detection unit 18 may be configured to function as the collision detection means so that the collision detection unit 18 detects the direct collision of the pedestrian with the front face part 4 of the vehicle from information provided by the acceleration sensor.

Although the present disclosure has been described with reference to the embodiments, the present disclosure is not limited to the embodiments, and changes can be appropriately made without departing from the scope of the present disclosure. That is, other embodiments, examples, operating technology and the like made on the basis of the embodiments by one skilled in the art are all included within the scope of the present disclosure.

For example, in the first and second embodiments, the plurality of airbags 14 each of which is long in the vehicle width direction is provided. However, the shape of the airbags 14 is not limited thereto, and may also be another shape inasmuch as the airbags are arranged in different height positions.

Also, in the first and second embodiments, the vehicle forward camera 12, the millimeter-wave radar 13, and the head position deduction unit 19 are configured to function as the head position detection means for detecting the height position of the head by deducing the pedestrian's head height position. However, the head position detection means is not limited thereto and other head position detection means may also be possible inasmuch as it can detect the pedestrian's head height position in front of the vehicle 1.

Also, in the first and second embodiments, the sizes of the airbags 14 are set different above and below the predetermined height position, so that the protruding amounts of the airbags 14 upon the forward deployment from the front face part 4 of the vehicle are different above and below the predetermined height position. However, the protruding amounts of the airbags 14 upon the deployment may be made different above and below the predetermined height position by another method. For example, the protruding, amounts of the airbags 14 upon the deployment may be made different above and below the predetermined height position by a method in which an amount of generation of the gas in the inflator below the predetermined height position is made smaller than an amount of generation of the gas in the inflator above the predetermined height position. In this case, the airbags 14 having the same size may be arranged above and below the predetermined height position.

Also, in the first and second embodiments, among the plurality of airbags 14, the size of the airbag 14S below the predetermined height position upon deployment is made smaller than the size of the airbag 14L above the predetermined height position upon deployment. However, the present disclosure is not limited thereto. For example, all the sizes of the plurality of airbags 14 upon deployment may be made to be the same.

The subject application is based on Japanese Patent Application No. 2017-179385 filed on Sep. 19, 2017, the contents of which are incorporated herein by reference.

INDUSTRIAL APPLICABILITY

The present invention has effects of suppressing the pedestrian from being bounced forward and protecting the pedestrians of different heights upon the collision with the pedestrian, and is useful for the pedestrian protection device and the like.

REFERENCE SIGNS LIST

1: Vehicle
3: Front window
4: Front face part of vehicle
8L, 8S: Pedestrian
10, 30: Pedestrian protection device
11: Vehicle speed sensor (before-collision detection means, collision detection means)
12: Vehicle forward camera (head position detection means, before-collision detection means, collision detection means, posture detection means)
13: Millimeter-wave radar (head position detection means, before-collision detection means, collision detection means, posture detection means)
14: Airbag
18: Collision detection unit (before-collision detection means, collision detection means)
19: Head position deduction unit (head position detection means)
20: Airbag control unit (airbag control means)
31: Movable panel (posture correction member)
36: Posture determination unit (posture detection means)
37: Panel control unit (correction member control means)

The invention claimed is:

1. A pedestrian protection device for a vehicle having a front face part of a vehicle upright below a front window, the pedestrian protection device comprising:
   a head position detector configured to detect a pedestrian in front of the vehicle and detecting a pedestrian's head height position;
   a collision detector configured to detect a collision between the pedestrian detected by the head position detector and the front face part of the vehicle;
   a plurality of airbags arranged in mutually different height positions of the front face part of the vehicle, and being deployable forward from the front face part of the vehicle from an accommodated state in which the airbags are accommodated in a deflated state behind the front face part of the vehicle; and
   an airbag controller configured to, when the collision detector detects a collision, deploy, from among the plurality of airbags, an airbag that can be deployed to the pedestrian's head height position detected by the head position detector.

2. The pedestrian protection device for a vehicle according to claim 1, wherein a protruding amount of an airbag of the plurality of airbags that is below a predetermined height position upon forward deployment from the front face part of the vehicle is smaller than that of an airbag above the predetermined height position.

3. The pedestrian protection device for a vehicle according to claim 1, further comprising:
- a before-collision detector configured to detect a state before a collision, in which it is not possible to avoid a collision of the pedestrian with the front face part of the vehicle, before the collision detector detects the collision of the pedestrian with the front face part of the vehicle;
- a posture detector configured to detect:
  - a forward tilted state in which a pedestrian's head in front of the vehicle is arranged further forward than a leg; and
  - a backward tilted state in which the pedestrian's head in front of the vehicle is arranged further backward than the leg;
- a posture correction member, which is arranged in a height position below a deployment area of at least one airbag of the plurality of airbags, and which is supported to a vehicle body-side so as to be movable in a front and rear direction between: a usual position in which the posture correction member does not protrude forward from the front face part of the vehicle; and an operation position in front of the front face part of the vehicle and below the deployment area; and
- a correction member controller configured to control the posture correction member,
- wherein when the before-collision detector detects the state before a collision, the correction member controller is configured to:
  - in a case the posture detector detects the forward tilted state, perform a forward tilted posture correction control; and
  - in a case the posture detector detects the backward tilted state, perform a backward tilted posture correction control,
- wherein the forward tilted posture correction control comprises a control of approximating a pedestrian's posture to a substantially upright state in which the pedestrian is not inclined in the front and rear direction by moving the posture correction member from the usual position to the operation position and permitting backward movement of the posture correction member from the operation position due to contact with the pedestrian while absorbing energy, and
- wherein the backward tilted posture correction control comprises a control of approximating a pedestrian's posture to the substantially upright state by moving the posture correction member from the usual position to the operation position and restricting backward movement of the posture correction member from the operation position due to contact with the pedestrian for a predetermined time.

4. The pedestrian protection device for a vehicle according to claim 3,
- wherein a rear surface of the posture correction member is provided with an actuator that is extendable,
- wherein the actuator connects the rear surface of the posture correction member and a vehicle body-side behind the front face part of the vehicle each other, and
- wherein the posture correction member is supported to the vehicle body-side such that the posture correction member is swingable between the usual position and the operation position about a shaft as the actuator extends, the shaft extending in a vehicle width direction in a position corresponding to a lower end portion of the posture correction member.

5. The pedestrian protection device for a vehicle according to claim 4,
- wherein the actuator comprises: a cylinder that is extendable; and a piston supported to the cylinder so as to be slidable,
- wherein the cylinder has: one end supported to a vehicle body-side behind the front face part of the vehicle and; the other end from which the piston protrudes, and
- wherein a tip end portion of the piston is coupled to the rear surface of the posture correction member.

6. The pedestrian protection device for a vehicle according to claim 3,
- wherein the posture correction member is long in a vehicle width direction,
- wherein the posture correction member is provided in plural, and
- wherein the plurality of the posture correction members is arranged side by side vertically to configure the front face part of the vehicle having a substantially planar shape.

7. A pedestrian protection device for a vehicle having a front face part of a vehicle upright below a front window, the pedestrian protection device comprising:
- head position detection means for detecting a pedestrian in front of the vehicle and detecting a pedestrian's head height position;
- collision detection means for detecting a collision between the pedestrian detected by the head position detection means and the front face part of the vehicle;
- a plurality of airbags arranged in mutually different height positions of the front face part of the vehicle, and being deployable forward from the front face part of the vehicle from an accommodated state in which the airbags are accommodated in a deflated state behind the front face part of the vehicle; and
- airbag control means for, when the collision detection means detects a collision, deploying, from among the plurality of airbags, an airbag that can be deployed to the pedestrian's head height position detected by the head position detection means.

* * * * *